United States Patent [19]

Brosh et al.

[11] Patent Number: 5,398,194

[45] Date of Patent: Mar. 14, 1995

[54] ELECTRONIC SENSING CIRCUIT USING PIEZORESISTORS

[75] Inventors: Amnon Brosh, Montvale; Donald Weinstein, Fair Lawn, both of N.J.

[73] Assignee: Kulite Semiconductor Products, Inc., Leonia, N.J.

[21] Appl. No.: 797,129

[22] Filed: Nov. 22, 1991

[51] Int. Cl.[6] ............................................. G01L 1/18
[52] U.S. Cl. ..................... 364/483; 364/481; 364/863; 324/610; 324/725; 340/660; 318/650
[58] Field of Search ............... 364/481, 483, 863, 558; 324/610, 133, 706, 725; 318/663, 650, 656, 657; 340/660–663; 361/88, 90

[56] References Cited

U.S. PATENT DOCUMENTS

| Re. 33,028 | 8/1989 | Simpson | 137/82 |
|---|---|---|---|
| 3,593,010 | 7/1971 | Sampson | 235/183 |
| 3,617,878 | 11/1971 | Senour | 324/57 |
| 3,747,042 | 7/1973 | Sheldon | 338/42 |
| 3,752,189 | 8/1973 | Marr et al. | 137/625.65 |
| 3,847,017 | 11/1974 | Watts | 73/88.5 R |
| 4,454,555 | 6/1984 | Delacy | 361/59 |
| 4,634,971 | 1/1987 | Johnson et al. | 324/133 |
| 5,001,623 | 3/1991 | Magid | 363/143 |

OTHER PUBLICATIONS

Tobey et al., *Operational Amplifiers*, The Maple Press Company, 1971, Chapter 6, pp. 201–212.
Omega Engineering, Inc., "Pressure and Strain Measurement Handbook and Encyclopedia," 1985, pp. A--7–A–10; E–7; E–39–E–40; E–43–E–46; E–59; E–62.

*Primary Examiner*—Kevin J. Teska
*Assistant Examiner*—Leigh Marie Garbowski
*Attorney, Agent, or Firm*—Arthur L. Plevy

[57] ABSTRACT

An electronic sensing circuit, which can be used in place of a linear variable differential transformer (LVDT) has four piezoresistor elements in a Wheatstone bridge configuration. A source voltage is applied across a first pair of bridge points, and the resulting junction voltages appearing at a second pair of bridge points are applied to a pair of inverting amplifiers in balanced configuration which provide first and second output voltages which change relative to each other depending upon the direction and amount of pressure applied to the piezoresistor elements in a manner similar to the output voltages provided by an LVDT.

5 Claims, 3 Drawing Sheets

ELECTRONIC SENSING CIRCUIT USING PIEZORESISTORS

BACKGROUND OF THE INVENTION

This invention relates to an electronic sensing circuit which is responsive to a physical parameter such as pressure or displacement. In particular, it relates to an electronic sensing circuit which can be used in place of a linear variable differential transformer to provide sensor voltage outputs.

Linear variable differential transformers (LVDT's) are routinely used as physical sensing elements, for example, as pressure transducers or for measuring small displacements. As shown in FIGS. 1A and 1B, the LVDT 6 has a primary coil 4, secondary coils 8 and 10, and a movable core 14. A given reference voltage E is applied across the primary coil 4 from a voltage source 2. The secondary coils have equal windings and have output terminals 16, 18, 20. FIG. 1A shows the LVDT with the output terminals 20 of the secondary coils in common ground configuration with the primary coil, whereas FIG. 1B shows the output terminals in isolated configuration.

The core 14 is movable (indicated by the direction of the arrows) in response to a physical parameter, such as applied pressure or linkage to a component which undergoes small physical displacements. When the core 14 is symmetrically positioned between the two secondary coils, the output voltages V1 and V2 are equal. When the core 14 is displaced in either direction, the relation of the output voltages V1 and V2 changes correspondingly. Thus, the direction and amount of movement of the core 14 is indicated when V1 decreases relative to V2, and vice versa.

Although commonly used, LVDT's are subject to transducer failure and erroneous outputs, particularly in high vibration environments. The position of the core can be affected by vibrations and acceleration forces. It is therefore desirable to replace the LVDT in a sensing circuit with a sensing element that is less prone to transducer failure and erroneous outputs.

SUMMARY OF THE INVENTION

An electronic sensing circuit for providing output operating levels as provided by an LVDT device, comprising a Wheatstone bridge sensing circuit responsive to applied pressure and having strain gauges where at least one gauge in said bridge varies resistance for a force applied in one direction and another gauge in said bridge varies resistance for a force applied in an opposite direction, means coupled to said bridge for applying an operating voltage thereto, and output means coupled to said bridge for converting the voltage changes from said bridge to first and second voltages, with said first and second voltages equal for a zero force applied to said bridge and with said first and second voltages increasing and decreasing linearly for a force applied in either direction, whereby the sum of said first and second voltages is constant for any direction and value of applied force, wherein said sensing circuit provides said voltages as provided by an LVDT device.

DETAILED DESCRIPTION OF THE FIGURES

Figure 1A:
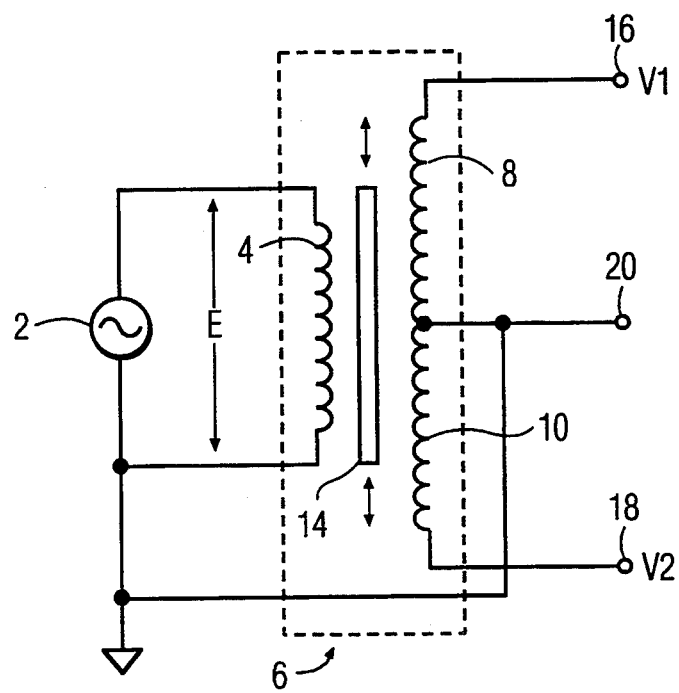
FIGS. 1A and 1B show the conventional LVDT element of the prior art in common ground and isolated configurations, respectively.
Figure 1B:
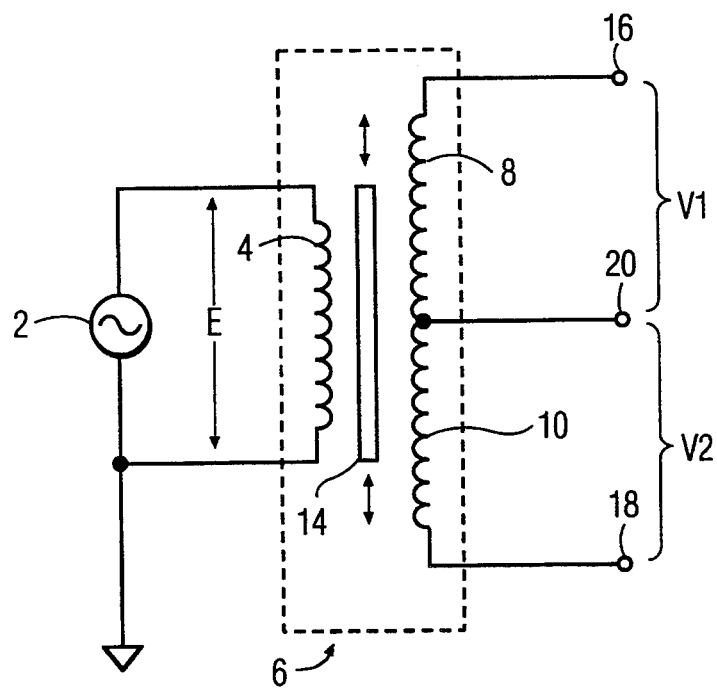
Figure 2:
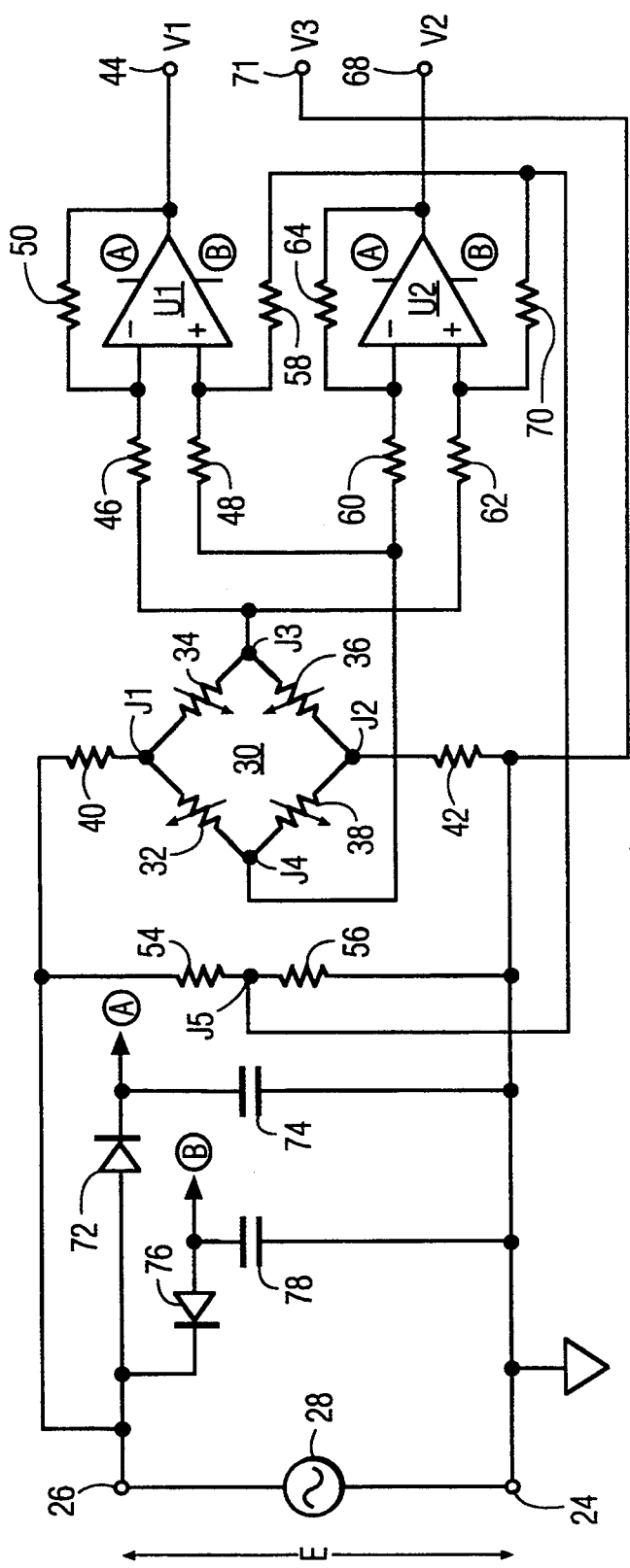
FIG. 2 is a circuit diagram of one embodiment of the electronic sensing circuit using piezoresistors in accordance with the invention.

Referring to FIG. 2, a preferred embodiment of the electronic sensing circuit of the present invention has an A.C. source voltage E applied across terminals 24, 26 from a voltage source 28. A Wheatstone bridge circuit 30 has four piezoresistor elements 32, 34, 36, 38 arranged in two bridge legs connected in parallel between a first pair of bridge points J1 and J2. Each bridge leg has two piezoresistor elements connected in series, i.e., piezoresistor elements 32, 38 and elements 34, 36 respectively. A second pair of bridge points J3 and J4 are the connection points between the piezoresistor elements of the respective bridge legs.

The piezoresistor element is an electronic component which is commercially available. For examples of such bridge arrangements, reference is made to U.S. Pat. No. 4,192,005 entitled COMPENSATED PRESSURE TRANSDUCER EMPLOYING DIGITAL PROCESSING TECHNIQUES, issued on Mar. 4, 1980 to A. D. Kurtz and assigned to Kulite Semiconductor Products, Inc., the assignee herein. See also U.S. Pat. No. 4,814,856 entitled INTEGRAL TRANSDUCER STRUCTURES issued on Mar. 21, 1989 to A. D. Kurtz et al. and assigned to the assignee herein. Such elements are commercially available from Kulite Semiconductor Products of Leonia, N.J. This piezoresistor has a crystal element which has the property that when pressure is applied to deform the crystal element, the electrical resistance through the crystal changes. For a given operational range, the resistance changes approximately linearly with crystal deformation.

The source voltage E is applied across the first pair of junction points J1 and J2 through resistors 40 and 42, respectively. The piezoresistor element 32 in one leg and the element 36 in the other leg are arranged together to sense a physical parameter applied in one direction, and the other piezoresistor elements 34, 38 sense a physical parameter applied in an opposite direction. When the physical parameter is applied in a particular direction, the resistances of the corresponding pair of piezoresistor elements increase (as shown by the directions of the arrows superimposed on the elements in the figures), and correspondingly change the junction voltages at bridge points J3 and J4 in the well known Wheatstone bridge relation. The piezoresistor elements are selected to have the same properties, so that when no pressure is applied the junction voltages at J3 and J4 are equal.

The junction voltages at J3 and J4 are applied to the inverting (−) and non-inverting (+) terminals of the operational amplifier U1 through resistors 46 and 48, respectively, and to the non-inverting (+) and inverting (−) terminals of the operational amplifier U2 through resistors 62 and 60, respectively. A feed back resistor 50 is coupled between the inverting input terminal and the output terminal of the amplifier U1, and similarly the feed back resistor 64 is coupled to the terminals of the amplifier U2.

The amplifiers U1 and U2 are in paired configuration to provide corresponding output voltages V1 and V2 at output terminals 44 and 68 which vary with the changing relation of the junction voltages. In order that the null point of the output voltages V1 and V2 be referenced to one-half the level of the source voltage E, a biasing voltage at junction J5 divided between resistors 54 and 56 is applied to the non-inverting terminals of the amplifiers U1 and U2 through resistors 58 and 70, respectively. High and low operating voltages A and B for the amplifiers U1 and U2 are derived from the source voltage E through the one-way diode 72 and capacitor 74 and the opposite one-way diode 76 and capacitor 78, respectively. The third output terminal 71 is connected to common ground.

The operation of the Wheatstone bridge of piezoresistors will now be described. When no pressure is applied to the piezoresistor elements, the output voltages V1 and V2 are equal and at the null point. If pressure is applied in one direction such that the voltage at J3 decreases relative to the voltage at J4, the voltage V1 increases and the voltage V2 decreases correspondingly. Conversely, if pressure is applied in the other direction such that the voltage at J3 increases relative to the voltage at J4, the voltage V1 decreases and the voltage V2 increases correspondingly. The output voltages V1 and V2 change relative to each other depending upon the direction and amount of the applied physical parameter in a manner similar to the output voltages provided by an LVDT. Thus, the electronic sensing circuit can be used in place of an LVDT. Since the components of the electronic sensing circuit are electronic, they will not be affected by vibrations and acceleration forces and erroneous sensor outputs are eliminated.

Figure 3:
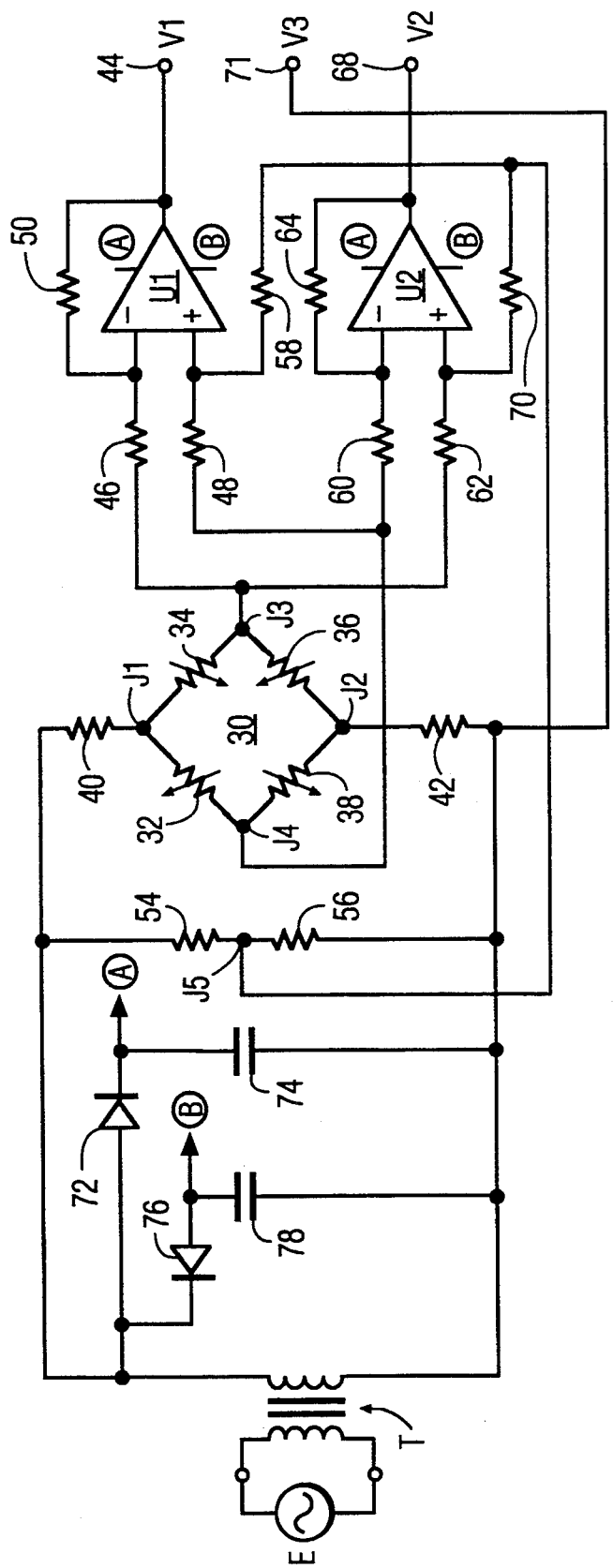
FIG. 3 is a circuit diagram of an alternate embodiment of the electronic sensing circuit.

In FIG. 3, the electronic sensing circuit is shown in isolation configuration, in which the source voltage E is applied through the isolation transformer T. All other components are substantially the same as in FIG. 2.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

We claim:

1. An electronic sensing circuit for replacing an LVDT device, comprising:

a Wheatstone bridge sensing circuit responsive to applied pressure and having piezoresistive strain gauges where at least one gauge in said bridge varies resistance for a force applied in one direction and another gauge in said bridge varies resistance for a force applied in an opposite direction, wherein said Wheatstone bridge includes two bridge legs, each with two piezoresistive elements in series, said bridge legs being connected in parallel between a first pair of bridge points, with a second pair of bridge points being formed by respective connection points between the piezoresistor elements of the respective bridge legs, wherein a piezoresistor element in one bridge leg and an opposite piezoresistor element in the other leg are arranged together to vary their resistances in response to a force applied to said elements in said one direction, and the other piezoresistor elements are arranged together to vary their resistances in response to a force applied in said opposite direction;

first and second input terminals for receiving an AC operating voltage applied therebetween, coupled to said first pair of bridge points wherein first and second voltages are provided at respective first and second ones of said second pair of bridge points, wherein an applied force in either direction produces changes in said first and second voltages; and first and second operational amplifiers having first and second output terminals, respectively, each having non-inverting and inverting terminals;

said first one of said second pair of bridge points being coupled to said non-inverting terminal of said first amplifier, and to said inverting terminal of said second amplifier, said second one of said second pair of bridge points being coupled to said inverting terminal of said first amplifier and to said non-inverting terminal of said second amplifier;

a third output terminal coupled to said second input terminal of said sensing circuit and forming a common ground therewith;

said first and second voltages being converted to third and fourth output voltages, respectively, at said first and second output terminals, with said third and fourth output voltages equal for a zero force applied to said bridge and with said third and fourth output voltages increasing and decreasing correspondingly for said force output applied in either direction, whereby the sum of said third and fourth voltages is constant for any direction and value of applied force.

2. An electronic sensing circuit according to claim 1, further including:

a first resistor having a first terminal coupled to said first input terminal of said sensing circuit, and having a second terminal;

a second resistor having a first terminal coupled to said second terminal of said first resistor to form a junction point, and a second terminal coupled to said second input terminal of said sensing circuit;

each of said non-inverting terminals of said first and second operational amplifiers being coupled to said junction point wherein said first and second operational amplifiers are biased to a null point of approximately one-half of a source voltage.

3. An electronic sensing circuit according to claim 2, further including;

a first diode having an anode coupled to said first input terminal of said sensing circuit, and a cathode;

a second diode having a cathode coupled to said first input terminal of said sensing circuit, and an anode;

a first capacitor having a first terminal coupled to said cathode of said first diode to form a second junction point, and a second terminal coupled to said second input terminal of said sensing circuit whereby a second operating voltage is derived from said source voltage and provided at said second junction point;

a second capacitor having a first terminal coupled to said anode of said second diode to form a third junction point, and a second terminal coupled to said second input terminal of said sensing circuit, whereby a third operating voltage is derived from said source voltage and provided at said third junction point;

each of said operational amplifiers being coupled to said second junction point wherein said second operating voltage is supplied to said operational amplifiers, and to said third junction point where said third operating voltage is supplied to said operational amplifiers.

4. An electronic sensing circuit according to claim 1, further including an isolation transformer wherein said AC operating voltage is applied therethrough.

5. The electronic sensing circuit according to claim 1, wherein said piezoresistor elements include a crystal element which deforms upon the application of applied pressure, thereby varying the electrical resistance through said piezoresistor element approximately linearly with the deformation of said crystal.

* * * * *